C. L. MacKENZIE.
COOKING UTENSIL.
APPLICATION FILED NOV. 6, 1914.
1,166,844. Patented Jan. 4, 1916.
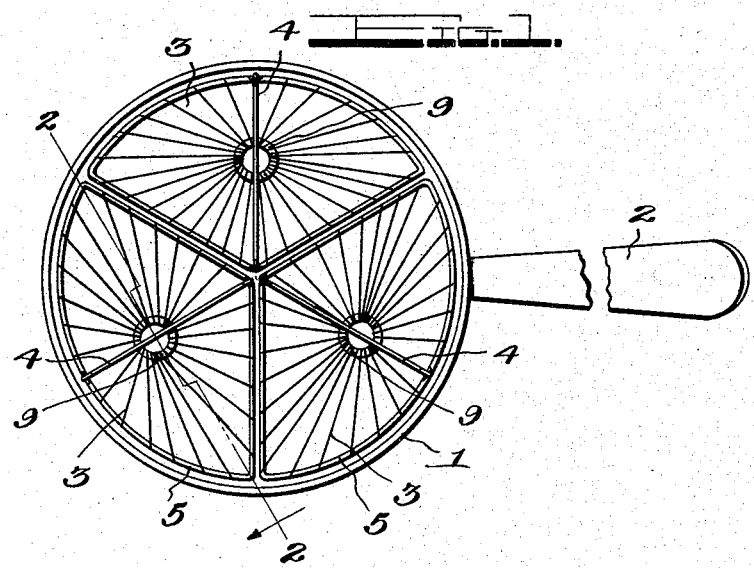
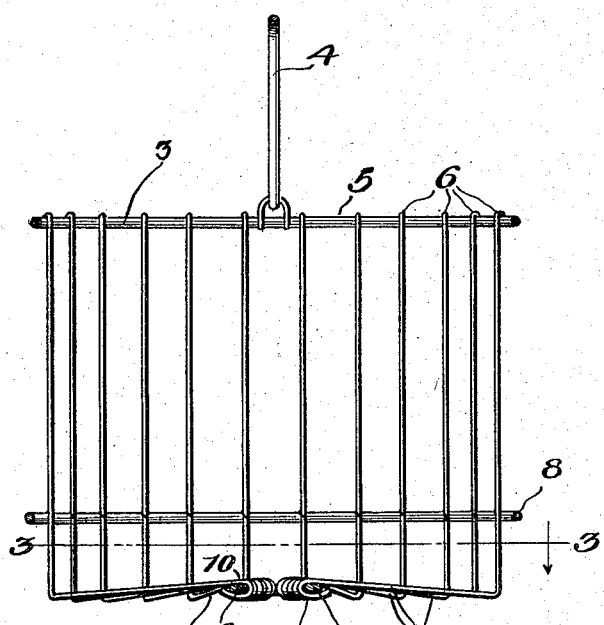
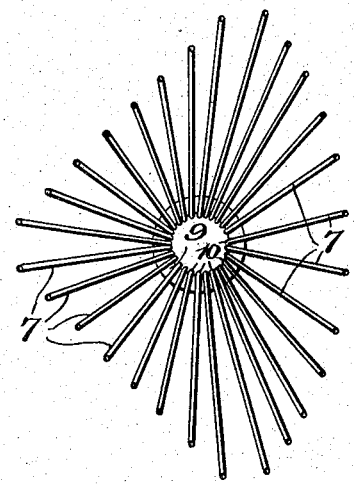
Witnesses
Ada E. Hagerty
Grace A. Davis
Inventor
Clara L. MacKenzie
By Joseph H. Miller
Attorney

UNITED STATES PATENT OFFICE.

CLARA L. MacKENZIE, OF PROVIDENCE, RHODE ISLAND.

COOKING UTENSIL.

1,166,844.  Specification of Letters Patent.  Patented Jan. 4, 1916.

Application filed November 6, 1914. Serial No. 870,593.

*To all whom it may concern:*

Be it known that I, CLARA L. MACKENZIE, a citizen of the United States, residing at Providence, in the county of Providence and State of Rhode Island, have invented a new and useful Improvement in Cooking Utensils, of which the following is a specification.

This invention relates to certain new and useful improvements in cooking utensils, and the primary object of the invention is to provide a cooking utensil of improved and novel construction which occupies but small space on the stove and which allows of the cooking of several different vegetables, in different baskets, at the same time, so as to allow the baskets to be independently inserted within or withdrawn from the main container.

A further object of the invention is to provide an improved basket construction, which is strong and serviceable.

In the drawings Figure 1 is a top plan view of the invention complete. Fig. 2 is a sectional view of one of the baskets, taken on the line 2—2 of Fig. 1, and Fig. 3 is a section taken on the line 3—3 of Fig. 2.

In proceeding in accordance with the present invention a main container 1 is employed which may be a pot or kettle having a handle 2. Within the main container there are a plurality of independent baskets 3, which may be of any desired number and which are provided with hinged handles or bails 4 so as to enable the baskets to be independently removed from the main container when desired, or placed therein. The baskets are of segmental form so as to fit within the main container, as shown in Fig. 1, and in construction the baskets are formed as follows: A series of vertical wires are hooked at their upper ends at 6 around a top wire 5 which defines the shape of the basket, while the lower ends of the wires are bent at substantially right angles to form bottom members 7, which conjointly form the bottom of the basket. A wire 8 extends around the vertical wires and is soldered thereto just above the bottom parts 7 of the vertical wires. A ring 9 is disposed at the central part of the bottom of the basket and is engaged by the bottom parts 7 of the vertical wires bending or hooking said parts 7 about the ring, whereby it will be seen that each of the parts 7 is secured to the ring 9. The ring is slightly elevated to compensate for the hooked or bent ends of the parts 7 so that the ring will not interfere with a firm seating of the basket bottom on the bottom of the main container.

In use, the different vegetables are placed within the several baskets, following which the latter are placed within the main container. The vegetables are thus kept separate within the main container and prevented from contacting with one another, while still allowing the water to freely circulate from one basket to another.

Having thus described my invention, I claim as new and desire to secure by Letters Patent;—

A basket of segmental cross-section having a hinged handle which is of inverted U-form connected at one end to the apex of the basket and at its opposite end to a peripheral point on the basket central of the sides of the basket, whereby a series of baskets may be arranged to have their peripheries conjointly define a circle and be carried when so related by use of but one hand by grasping the inner sides of the handles at the tops thereof which inner sides are each located at the center of the circle, said handle extending entirely across the basket and being hinged thereto at the top edge of the basket so that when the handle is moved to lie in horizontal position same will be supported on the top edge of the basket.

In testimony whereof I have signed my name to this specification in the presence of two subscribing witnesses.

CLARA L. MACKENZIE.

Witnesses:
ADA E. HAGERTY,
J. A. MILLER.

Copies of this patent may be obtained for five cents each, by addressing the "Commissioner of Patents, Washington, D. C."